United States Patent [19]

Alts

[11] Patent Number: 5,683,764
[45] Date of Patent: Nov. 4, 1997

[54] INSULATING GLASS

[75] Inventor: Thorsten Alts, Gross-Bieberau, Germany

[73] Assignee: Rieter Automotive (International) AG, Zollikon, Switzerland

[21] Appl. No.: 506,810

[22] Filed: Jul. 25, 1995

[30] Foreign Application Priority Data

Jul. 26, 1994 [CH] Switzerland ................ 2352/94

[51] Int. Cl.[6] .................................................. E06B 3/24
[52] U.S. Cl. .................. 428/34; 52/786.11; 52/786.13; 428/304.4
[58] Field of Search .................... 428/34, 192, 432, 428/428, 304.4; 52/786.1, 786.13

[56] References Cited

U.S. PATENT DOCUMENTS

| 3,935,683 | 2/1976 | Derner et al. ................ 52/172 |
| 4,831,799 | 5/1989 | Glover et al. ................ 52/172 |

FOREIGN PATENT DOCUMENTS

| 0 014 235 | 8/1980 | European Pat. Off. . |
| 0 034 813 | 9/1981 | European Pat. Off. . |
| 0 100 701 | 2/1984 | European Pat. Off. . |
| 0 296 690 | 12/1988 | European Pat. Off. . |
| 517 242 | 2/1972 | Switzerland . |
| 553 907 | 9/1974 | Switzerland . |
| 615 244 | 1/1980 | Switzerland . |
| 630 993 | 7/1982 | Switzerland . |
| 640 302 | 12/1983 | Switzerland . |
| 681 102 | 1/1993 | Switzerland . |

*Primary Examiner*—Donald Loney
*Attorney, Agent, or Firm*—Wigman, Cohen, Leitner & Myers, P.C.

[57] ABSTRACT

An insulating glass including at least two window panes (20, 21), which are placed at a distance from one another and encompass a sound absorber made of open-celled material, in particular made of sintered or foamed aluminum. The sound absorber increases the flow resistance of the gas enclosed between the plates, made of a mechanically rigid material, and serves as a spacer (28). The insulating glass is especially suited for vehicle construction.

14 Claims, 2 Drawing Sheets

INSULATING GLASS

FIELD OF THE INVENTION

The present invention relates to a sound absorbent insulating glass.

BACKGROUND OF THE INVENTION

To improve the sound insulation of insulating glass, numerous means, for example the use of glass with larger specified densities, larger thicknesses or with multi-layer construction to improve the thermal and acoustic transmission coefficients are known, as described, for example, in European patent EP 0 100 701. One of the insulating window constructions preferred in vehicle or building construction is a bonding of two or more glass plates or other light transmissible materials, which form at least one particular thermally insulating gap of air with spacers which usually follow the edge of the plates.

Numerous examples of such double or multiple-layer glass are known from the prior art, for example from Swiss patent numbers 640,302; 681,102; 553,907 and 517,242. For such glass, a more or less sealed space results in the interior which is bordered by the plates and the spacers. This space has resonances in the audible frequency range, which cause a reduction of the sound insulation in the frequency range of this resonance; this reduction is known as anti-resonance in the characteristic sound absorption or sound insulation curve. Suitable measures for damping the anti-resonance, as for example material selection, especially geometry or a division of the interior space are described in European patents EP 0,296,690; EP 0,014,235 and EP 0,034,813 and lead to a shifting of the anti-resonance into deeper frequencies.

Another known possible solution is the improvement of the sound absorption in the air gap, preferably by producing a vacuum, which is often not done for economic reasons. A sound absorbent area or an open-celled soft elastic material which is connected with the spacer can be inserted in the edge area of the air gap.

In addition, it is known from Swiss patent numbers 615,244 or 630,993 to insert an elastic rubber, and/or sound insulating material, between the spacers and the glass plates; this is particularly of importance when using metal hollow sections as spacers, since these sections are not sound absorbent. A significant disadvantage of the known insulating glass is this lack of resistance of the material against light and/or moisture.

SUMMARY OF THE INVENTION

An object of the invention is to overcome or at least reduce the disadvantages of the prior art mentioned above.

Surprisingly, it was found that the function of the spacer could be combined with that of a sound absorber. The insulating glass in accordance with the invention includes a sound absorber comprising a mechanically rigid material which also serves as a spacing element at the same time.

Panes made of mineral glass are particularly under consideration as window panes. Panes can be used that are partially or completely made of glass-like transparent organic material, such as, for example, polycarbonate, polyacrylate and similar materials. Natural or synthetic elastomers with the required stability or resistance can be used as rubber elastic material.

Parts described as "sound absorber" parts are those having measurably low conductibility for sound in relation to pure base metal due to their physical structure or their mechanical construction. Foamed or other porous structures, as for example, plastic foam, fall within this description.

An "open-celled" material is understood in accordance with the invention to be a material having macroscopic cells which are connected together such that a fluid can pass through the material faster than only being diffused. Typical cell sizes lie in the range of 1 to 1000 micrometers.

A "mechanically rigid material" is a material which does not have a Brinell hardness of less than 150 $mm^2$ under the temperature of the application in consideration.

In general, a suitable material must be sufficiently stable in form to maintain the plates in the desired position; moreover, it must absorb air-borne as well as structure-borne sound, which is caused by an open-celled structure in accordance with the invention. Materials which make this possible are, for instance, sintered or foamed aluminum, foamed ceramic material and other practically mechanically rigid materials with open-celled structures which are known to one skilled in the art.

The invention offers various advantages, in particular a greatly simplified construction of the connection and sealing zone for insulating glass made of at least two spaced window panes, which lead, for its part, to savings in its production. For example, procedural steps, such as adhesion of additional insulating materials to the spacer, can be done away with. Since the spacer is itself sound insulating, this requirement for the sealing and/or adhering material can be left out, so that other materials can be used for sealing and/or adhering.

The present invention is explained in more detail in the description which follows with the help of the attached drawings.

DETAILED DESCRIPTION OF THE INVENTION

Figure 1:
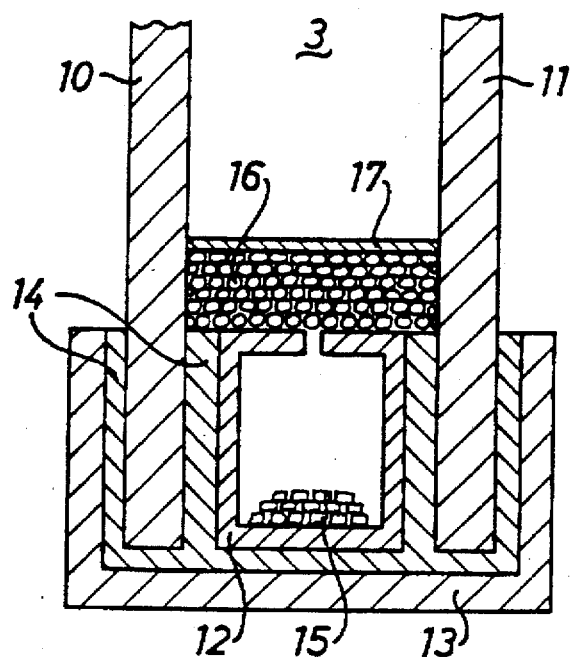
FIG. 1 shows schematic construction of a connection zone of two glass plates of a sound insulating double glass in accordance with the prior art.

The connection zone of a sound insulating double pane insulating glass in accordance with the prior art as is shown schematically in FIG. 1, comprises an outer plate 10 and an inner plate 11 with a spacer 12 in between these and a surrounding border 13. This border 13 can be left out if the plates are connected with the spacer 12 by means of an adhesive. Simple or layered seals 14 made of plastic, rubber or other elastic adhesive measures, laid between elements, provide for the insulation of the intermediate space and also allow mutual, mechanical and thermal movement of the plates 10, 11, the spacer 12 and the border 13. One plate or both plates 10, 11 can comprise multi-layer glass and the spacer 12 is a piece which is stable in form running around the window frame, preferably made of aluminum. To avoid condensation of moisture from the air in the intermediate space between the plates 10, 11, small amounts of a moisture-absorbent material 15 are filled in a known fashion in the air gap or in the spacing piece 12 which has corresponding air holes. To improve the sound absorption in the air space 3, a sound absorbent soft elastic foam 16 is adhered to the spacer piece 12. As a protection from damaging UV rays, or for reasons of optical appearance, a sound and moisture-permeable color, lacquer or foil layer 17 can cover the foam 16.

Figure 3:
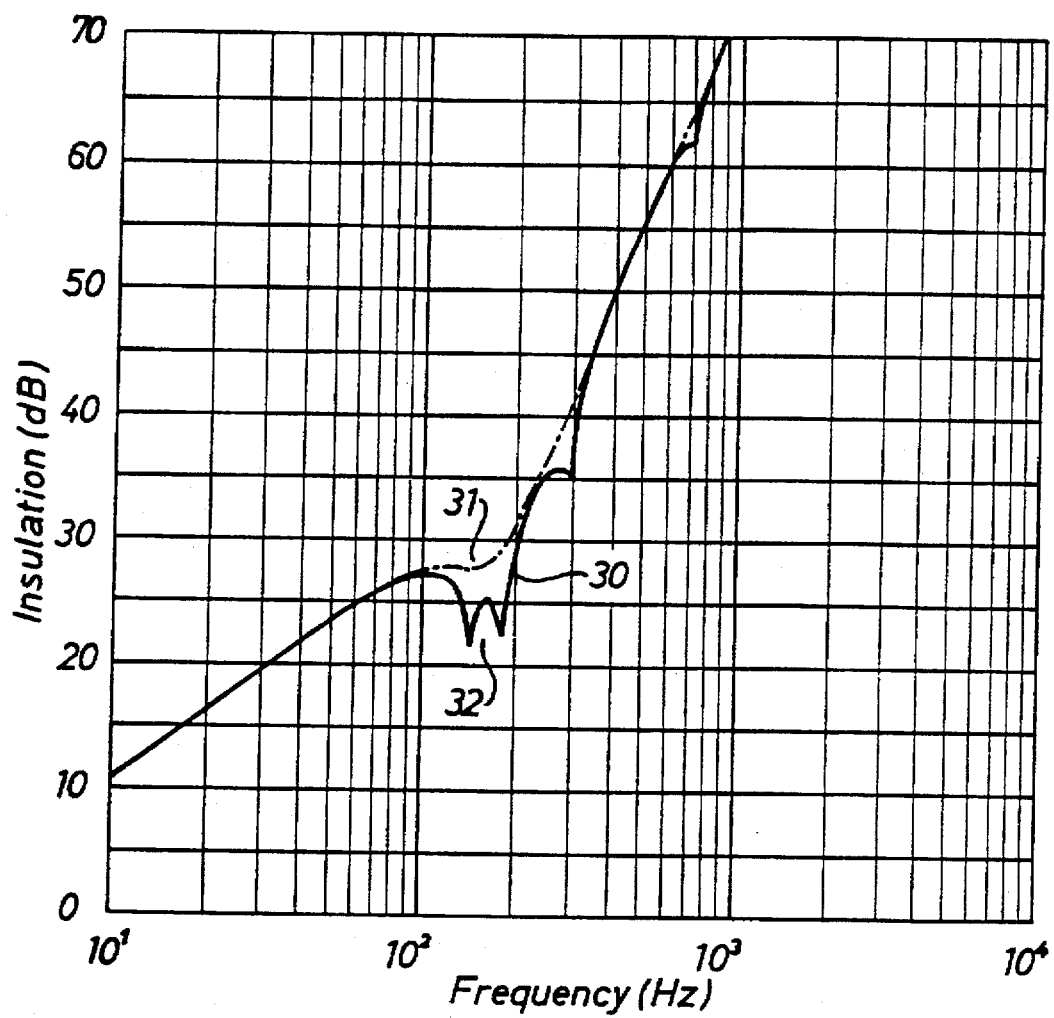
FIG. 3 shows a diagram with curves, which indicate the sound insulation in relation to the frequency.

The diagram in FIG. 3 shows the sound damping of the insulation glass, measured in decibels (dB) as the ordinate, versus the log 10 of the frequency, measured in hertz (Hz) as the abscissa. The curve 30 represents the insulation for an insulating glass of a known type with the characteristic reduction of the insulation effect as a result of the anti-resonance 32. The values are determined for about 1.4 m by 0.9 m large double pane glass from railroad cars, whereby the inner plate 10 comprises a multi-layer glass with two 3 mm thick mineral glass plates and an intermediate 0.1 mm thick multi-layer foil made of organic polymer material and the other comprises massive mineral window glass of a plate 11 8 mm thick at a distance of about 22 mm.

Surprisingly, the spacer 12 can also be inserted for improving the sound isolation in the frequency range of the anti-resonance 32 in accordance with the invention, whereby instead of the sound transmitting spacer, i.e. an aluminum hollow piece 12, a sound absorbent solid piece 28 is used.

Figure 2:
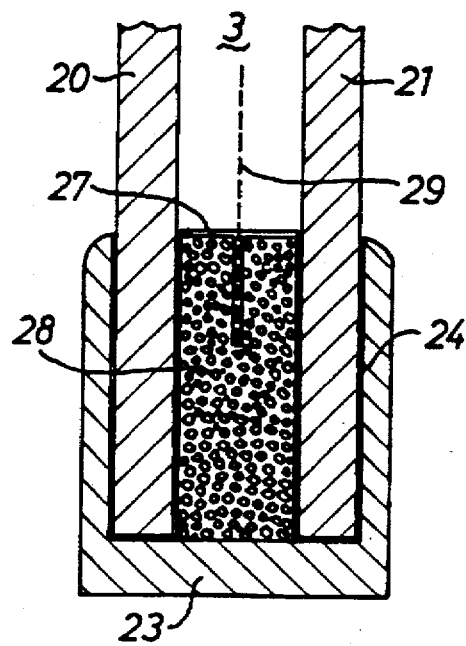
FIG. 2 shows the construction of a connection zone in accordance with the invention.

The spacer piece 28 in accordance with the invention, as it is schematically depicted in FIG. 2, absorbs and therefore damps the structure-borne sound between the outer and inner plates, as well as the sound energy in the open space 3 between these plates and also takes on the function of the spacer 12 at the same time.

The embodiment of an insulating glass in accordance with the invention shown in FIG. 2 includes two plates 20 and 21, of which the outer plate preferably comprises a multi-layer glass. For this, it proves to be significant for improving the insulation effect that the vibrational behavior of the plates differs from one another. This can be achieved by using differently constructed and/or different weight plates. The sound absorbing spacer 28 comprises 50 mm thick porous sintered aluminum and sets the two glasses at a distance of about 22 mm. A clamping frame 23 made of aluminum holds the plates 20, 21 and the sound absorbent spacer 28. An elastic sealing mass 24 allows the different components to expand with heat without damage. The embodiment shown in FIG. 2 has a microporous foil 29 between the two outermost plates 20, 21. This has an effect analogous to the distancing piece 28 in the invention, in that this foil increases the flow resistance in the inner space 3 of the glass. It corresponds to the basic idea of the present invention of improving the sound insulation effect of the insulating glass by increasing the flow resistance of the gas vibrating in the inner space 3 and simultaneously simplifying the construction of the entire insulating glass. Of course, the pore size of the spacer 28 or the intermediate foil 29 is selected in a suitable manner when using gasses other than air or in the case of glass partially under vacuum. Helpfully, the inner surface of the spacer 28 can also be provided with a non-permeable but sound-transparent gas layer.

The curve 31 in FIG. 3 shows the sound insulation of a railroad car window constructed in accordance with the invention with a loss factor of about 30%, produced by the measures in the invention, for the vibrational energy of the gas enclosed in the air gap 3, which leads to a distinct reduction of the anti-resonance 32.

Characteristic materials of the spacer 28 in the invention are open-pored, homogenous or nonhomogeneous materials which are practically stable in form, as for example, sintered or foamed aluminum. This preferred material also achieves, in the form of a solid piece, the required solidness which is provided on a correspondingly dimensioned hollow piece made of aluminum.

In a preferred embodiment of the invention applied to railroad windows, the porous and sound absorbent spacer 28 is made of sintered or foamed aluminum and installed in place of the usual hollow piece. Since this window is subjected to temperature fluctuations of about −20° to 50° C. and exposed to air pressure fluctuations of about 50,000 Pa/sec, a pressure equalization between the inner space 3 and the outer environment must be possible. The open-pored structure thus serves not only for better sound absorption, but also facilitates this pressure equalization.

Further embodiments of the spacer 28 in accordance with the invention exist in the combination of the same with different additional measures of a known kind. Thus, elastic adhesives, for example, vibrational damping and rubber elastic seals or diffusion blockages can be used together with the spacer in accordance with the invention. The use of other known sound absorbent materials which are stable in form, as for example, sintered or foamed mineral glass or ceramic, aerogels, foamed duromers such as epoxy or polyester or porous composite material as are made of compacted fiber material for instance, is contemplated.

In a particular configuration of the insulating glass in accordance with the invention, a porous material, especially a microporous foil or plate, is mounted between the outer plates 20, 21.

The insertion of a dehumidifying agent 15 in a specially provided groove lying inside or in the pores of the spacer 28 in the invention is contemplated. A geometric configuration, in particular for integrating the border 23 in the entire spacer is also contemplated.

The insulating glass in the invention can be used not only for railroad cars, but is also suitable for especially high noise protection requirements for application in building construction.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. Insulating glass comprising at least two window panes, which are placed at a distance from one another and encompass a sound absorbent element made of open-cell material, wherein the sound absorbent element is a mechanically rigid spacer made of a material selected from the group of materials consisting of metal and ceramic materials.

2. Insulating glass as in claim 1, wherein the sound absorbent element serving as the spacer is made of a material selected from the group of materials consisting of sintered aluminum, foamed aluminum and open-celled foam ceramic.

3. Insulating glass as in claim 1, wherein the spacer is provided with a diffusion-obstructive layer located on a frame side.

4. Insulating glass as in claim 1, wherein the inner surface of the space of the spacer is coated with a gas non-permeable layer with a thickness of less than 50 micrometers.

5. Insulating glass as in claim 1, wherein the spacer contains a hygroscopic material.

6. Insulating glass as in claim 1, wherein the window panes have a different vibrational behavior.

7. Insulating glass as in claim 1, wherein at least one of the window panes is a multilayer glass.

8. Insulating glass as in claim 1, wherein the spacer and the plates are mounted in a vibration damping material.

9. Insulating glass as in claim 1, wherein a porous foil is mounted between the individual plates.

10. Insulating glass as in claim 1, wherein a porous plate is mounted between the individual plates.

11. Insulating glass as in claim 1, wherein a microporous foil is mounted between the individual plates.

12. Insulting glass as in claim 1, wherein a microporous plate is mounted between the individual plates.

13. Insulating glass as in claim 1, wherein the inner space is partially under vacuum.

14. Insulating glass as in claim 1 wherein said mechanically rigid spacer is made of open-celled material having Brinell hardness of not less than 150 N/mm$^2$.

* * * * *